US006957989B2

(12) United States Patent
Itoi

(10) Patent No.: US 6,957,989 B2
(45) Date of Patent: Oct. 25, 2005

(54) ELECTRONIC CONTROLLED DRIVE APPARATUS

(75) Inventor: Makoto Itoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/750,964

(22) Filed: Jan. 5, 2004

(65) Prior Publication Data

US 2004/0137807 A1 Jul. 15, 2004

(30) Foreign Application Priority Data

Jan. 10, 2003 (JP) ............................ 2003-004577

(51) Int. Cl.[7] ............................................... B60K 41/04

(52) U.S. Cl. .............................. 440/1; 440/86; 440/87; 477/115

(58) Field of Search ................................ 440/1, 84, 86, 440/87; 477/115, 116; 701/21

(56) References Cited

U.S. PATENT DOCUMENTS 6,102,755 A * 8/2000 Hoshiba ........................ 440/1
6,587,765 B1 * 7/2003 Graham et al. ............... 701/21

FOREIGN PATENT DOCUMENTS

JP 10-131778 A 5/1998
JP 3278949 B2 2/2002
JP 3283405 B2 3/2002

* cited by examiner

*Primary Examiner*—Andrew D. Wright
(74) *Attorney, Agent, or Firm*—Sughrue Mion, PLLC

(57) ABSTRACT

An electronic controlled drive apparatus includes: a remote control unit 3 for calculating a target throttle opening degree and target shift position based on an inputted position of an operational lever of a remote control device 1; a throttle actuator 11 that opens or closes a throttle of the engine in accordance with the target throttle opening degree; a shift actuator 12 that actuates a shift in accordance with the target shift position; and a throttle actuator control unit 5 for determining whether or not the target shift position is in a shift-in state, and when the target shift position is in the shift-in state, driving the throttle actuator to put the throttle into the small opening degree state. The shift actuator is driven to conduct shift connection after the throttle is put into the small opening degree state.

2 Claims, 2 Drawing Sheets

ELECTRONIC CONTROLLED DRIVE APPARATUS

BACKGROUND OF THE INVENTION

1. Field of the Invention

The present invention relates to an electronic controlled drive apparatus, and more particularly to an electronic controlled drive apparatus which is mounted on a moving vehicle such as a boat, to conduct drive control of an internal combustion engine provided in the moving vehicle.

2. Description of the Related Art

In a marine field, there has been generally used a boat that is provided with an outboard engine in the rear of the boat, and which moves forward or backward according to the rotational direction of a propeller provided below the outboard engine. When such a boat in a forward running state is suddenly stopped in case of an emergency while driving the boat, or in the case where the boat is brought alongside the pier, a boat driver conducts a switching operation in the order of "forward (F: advance)", "neutral (N)", and "reverse (R: backward)" using a shift lever to stop the boat because the boat is not provided with a brake (for example, see JP 3278949 B).

However, there are the following problems with respect to such a conventional method. When a forward speed is high, even if the operation mode is switched to the "neutral" by the shift lever to cut drive power to the propeller, the boat continues to run forward for some time and the propeller continues to rotate slowly forward according to a flow due to the forward running of the boat. Therefore, in order to immediately stop the boat in this state, when the operation mode is switched to the "reverse" mode by the shift lever to reverse the rotational direction of the propeller, an extremely large load is applied to the engine, thereby temporarily and suddenly reducing the number of revolutions of the engine. Thus, in particular, an engine having small torque in a low rotation region causes engine stalling, and the boat cannot be adequately stopped.

Also, if, in order to prevent the above-mentioned engine stalling or the like, shift connection is conducted after the rotational speed of the drive axis of the propeller is sufficiently reduced, it takes a long time before the shift is connected, and the drivability is deteriorated.

SUMMARY OF THE INVENTION

The present invention has been made to solve the above-mentioned problems. Therefore, an object of the present invention is to obtain an electronic controlled drive apparatus capable of preventing a defect such as engine stalling and of improving a throttle responsiveness by opening a throttle to the degree which is resistant to a load caused at the time of shift connection before the shift connection is conducted.

According to the present invention, there is provided an electronic controlled drive apparatus that conducts drive control of an internal combustion engine which is provided in a moving vehicle, the electronic controlled drive apparatus including: control means having an operational lever; target value calculating means for calculating a target throttle opening degree and a target shift position based on an inputted position of the operational lever. The electronic controlled drive apparatus further includes a throttle actuator that opens or closes a throttle of the internal combustion engine in accordance with the target throttle opening degree by an operation of the control means. Tn electronic controlled drive apparatus also includes a shift actuator that actuates a shift in accordance with the target shift position by an operation of the control means. The electronic controlled drive apparatus further includes determination means for determining whether or not the target shift position is in a shift-in state. In addition, the electronic controlled drive apparatus includes correction throttle opening degree setting means for setting a predetermined throttle opening degree so as to put the throttle into a small opening degree state when the target shift position is in the shift-in state. When it is determined by the determination means that the target shift position is in the shift-in state, the control means drives the shift actuator to conduct shift connection after driving the throttle actuator to put the throttle into the small opening degree state in which the throttle is opened by the predetermined throttle opening degree. Therefore, the electronic controlled drive apparatus is capable of preventing a defect such as engine stalling and of improving a throttle responsiveness by opening a throttle to the degree which is resistant to a load caused at the time of shift connection before the shift connection is conducted. Consequently, it is possible to improve the-drivability.

DETAILED DESCRIPTION OF THE PREFERRED EMBODIMENT

Figure 1:
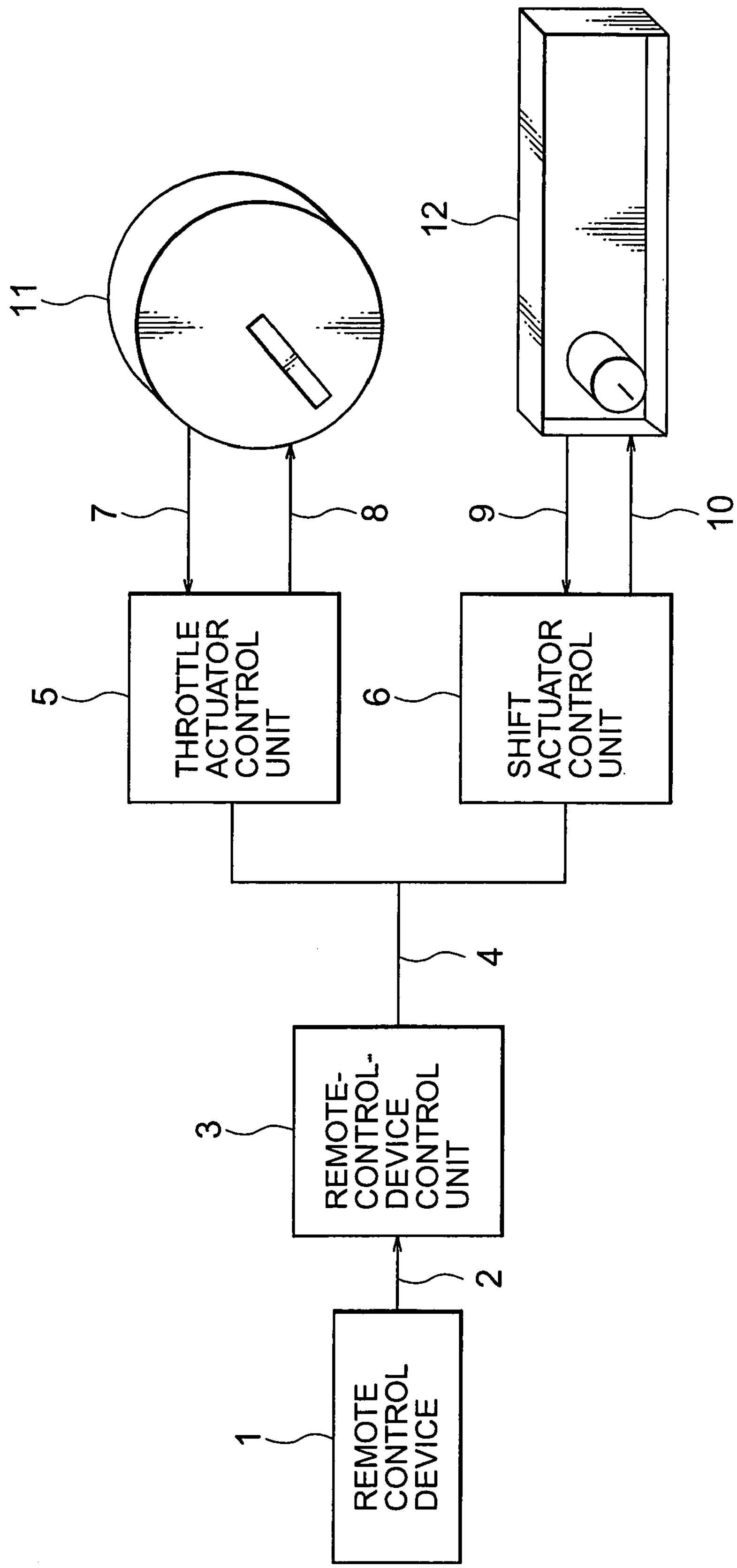
FIG. 1 is a block diagram showing a structure of an electronic controlled drive apparatus according to an embodiment of the present invention.

Hereinafter, an embodiment of the present invention will be described with reference to the drawings. In an electronic controlled drive apparatus according to this embodiment, a remote control device and a shift mechanism are electrically connected with each other. Here, an example in which the shift mechanism is actuated by the shift actuator will be described. In this time, according to a shift of a power transmission system that transmits the torque of an engine to the axis of a propeller, an operational lever of the boat is moved from the neutral to the forward or to the reverse to engage a clutch, thereby shifting a transmission. When the lever is further moved, an opening degree of the throttle increases to increase the number of revolutions. As shown in FIG. 1, the electronic controlled drive apparatus according to this embodiment includes a remote control device 1 in which an operational lever (not shown) which is operated by a boat driver is provided. A throttle lever is integrated with a shift lever to form the operational lever. The position of the operational lever is outputted as a voltage signal to a wire 2. The remote control device 1 is connected with a remote-control-device control unit 3 through the wire 2. The remote-control-device control unit 3 calculates a target shift position and a target throttle opening degree from the position of the operational lever which is obtained from the wire 2 and conducts communication with another node through a communication line 4. The communication line 4 is composed of a communication line in which BUS connection is made, such as a CAN. The communication line 4 is connected with a throttle actuator control unit 5 and a shift actuator control unit 6 such that they are parallel to each other.

The throttle actuator control unit 5 conducts communication with the remote-control-device control unit 3 through the communication line 4 and controls an electronic control throttle actuator 11. In other words, the throttle actuator control unit 5 obtains a throttle actuator opening degree from the throttle actuator 11 through a wire 7 and outputs a control signal to the throttle actuator 11 through a control line 8 to drive the throttle actuator 11. The throttle actuator 11 opens or closes the throttle of an internal combustion engine according to the target throttle opening degree received as the control signal.

The shift actuator control unit 6 conducts communication with the remote-control-device control unit 3 through the communication line 4 and controls an electronic control shift actuator 12. In other words, the shift actuator control unit 6 obtains a shift actuator position from the shift actuator 12 through a wire 9 and outputs a control signal to the shift actuator 12 through a control line 10 to drive the shift actuator 12. The shift actuator 12 actuates the shift according to the target shift position received as the control signal. Note that the shift actuator control unit 6 includes a memory and a down counter CWait (not shown). The memory stores a map (or a table etc.) for determining a shift actuation waiting time KWait described later based on the current number of revolutions of the engine. The down counter counts down the determined shift actuation waiting time KWait.

Figure 2:
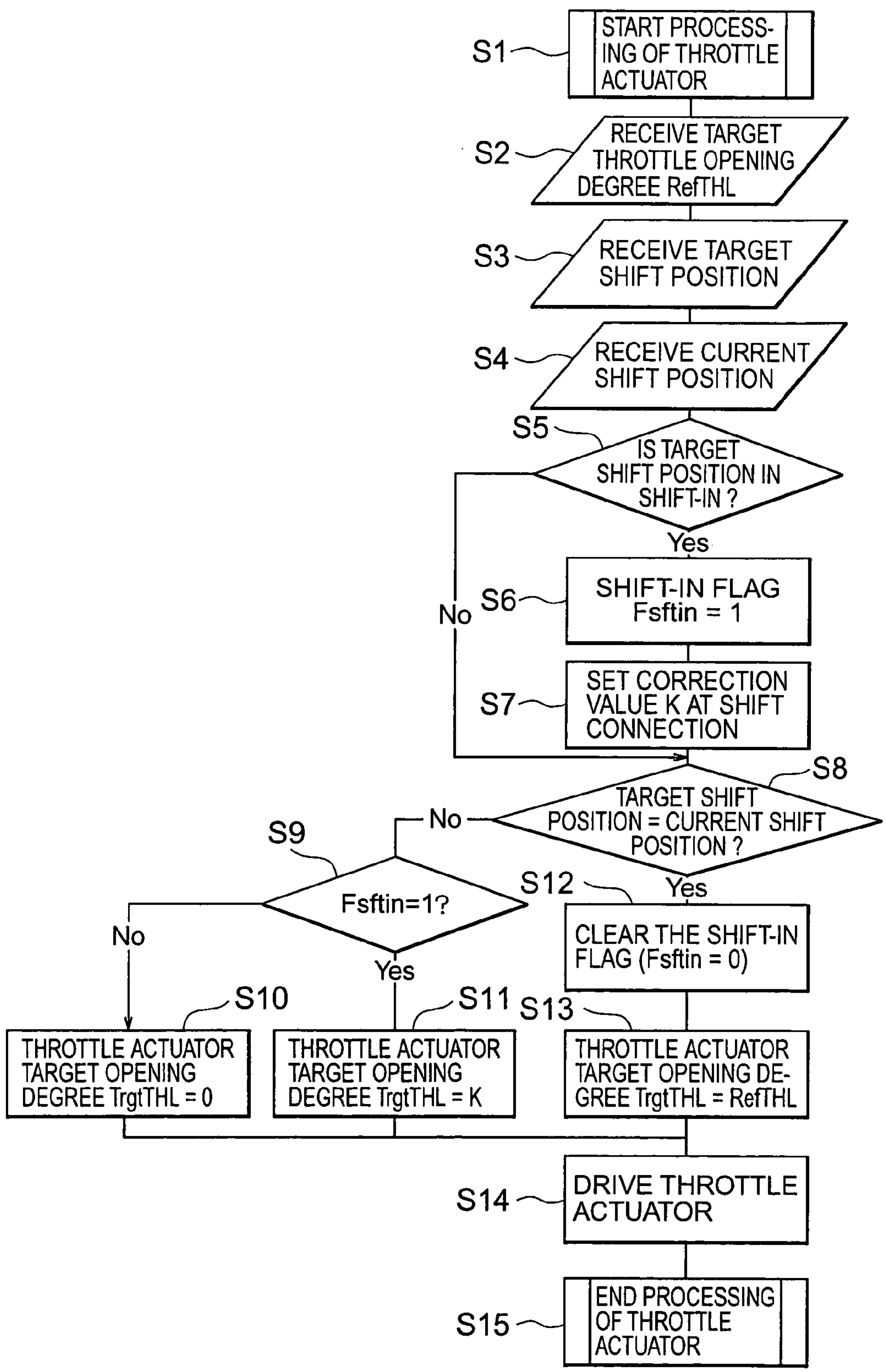
FIG. 2 is a flow chart showing an operation of a throttle actuator control unit provided in the electronic controlled drive apparatus according to an embodiment of the present invention.

Next, an operation of the throttle actuator control unit 5 will be described with reference to a flow chart shown in FIG. 2. Processing of the throttle actuator starts from Step S1.

Here, assume that the remote-control-device control unit 3 calculates a target shift position and a target throttle opening degree RefTHL from the position of the operational lever and transmits a current shift position together with the target shift position and the target throttle opening degree to the communication line 4.

In Step S2, the throttle actuator control unit 5 receives a target throttle opening degree RefTHL through the communication line 4.

Next, in Step S3, the throttle actuator control unit 5 receives a target shift position through the communication line 4.

In Step S4, the throttle actuator control unit 5 receives a current shift position through the communication line 4.

In Step S5, when the target shift position received in Step S3 is in a trigger state of a shift-in, a shift-in state is determined. In Step S6, a shift-in flag Fsftin is set to 1 (Fsftin=1). Note that the shift-in indicates switching from the neutral to the reverse or switching from the neutral to the forward.

Next, in Step S7, a correction throttle opening degree Kwhich is corrected at the time of shift connection is set. The correction throttle opening degree K is a value obtained by matching at the time of designing or manufacturing the apparatus and set to a low value capable of preventing engine stalling in the shift connection.

Next, the operation goes to Step S8. Note that, when it is determined in Step S5 that the target shift position is not in the trigger state of the shift-in, the control directly goes from Step S5 to Step S8 without any execution.

In Step S8, the target shift position received in Step S3 is compared with the current shift position received in Step S4. When both positions coincide with each other, the control goes to Step S12. When both positions do not coincide with each other, the control goes to Step S9.

In Step S9, when the shift-in flag Fsftin is 1 (FSftin=1), the control goes to Step S11. When the shift-in flag Fsftin is not 1, the control goes to Step S10.

In Step S10, a shift opening state is determined from the conditional determination results in Steps S8 and S9, and the throttle is fully closed (throttle actuator target opening degree TrgtTHL=0).

In Step S11, the shift-in state is determined from the conditional determination results in Steps S8 and S9, so that the opening degree of the throttle is set to the value K obtained in Step S7 (throttle actuator target opening degree TrgtTHL=K).

In Step S12, a shift-connected state is determined from the conditional determination results in Steps S8 and S9, and the shift-in flag Fsftin is set to 0. Then, in Step S13, the opening degree of the throttle is set to the opening degree value RefTHL received in Step S2 (throttle actuator target opening degree TrgtTHL=RefTHL).

In Step S14, the throttle actuator is driven using the value obtained in any one of Steps S10, S11, and S12.

In Step S15, a series of processings of the throttle actuator are ended.

As described above, according to the present invention, it is resistant to a load caused by the rotational axis of the propeller at the time of shift connection, thereby preventing the engine stalling at the time of the shift connection. If the rotational speed of the propeller is reduced until the shift can be connected in an idle rotational state by an ISC, the shift connection is delayed. Therefore, when it is determined that the target shift position is for the shift-in (neutral to reverse or neutral to forward) operation, the shift connection is conducted after the throttle actuator is driven to slightly open the throttle. Thus, power which can be resistant to the rotation of the drive axis of the propeller is produced in an extension drive axis, so that a defect such as engine stalling canbe prevented. In addition, because the throttle is already open at the time of shift connection, the opening operation of the throttle after the shift connection becomes rapid, thereby improving the responsiveness. Thus, according the present invention, the shift reverse operation becomes rapid, thereby improving the drivability. Note that the example in which the remote control device 1, the throttle actuator control unit 5, and the shift actuator control unit 6 are separately constructed is described in this embodiment. However, the present invention is not limited to this example. The remote control device 1, the throttle actuator control unit 5, and the shift actuator control unit 6 maybe integrally formed. Even with such a structure, the same effect is obtained.

What is claimed is:

1. An electronic controlled drive apparatus that conducts drive control of an internal combustion engine which is provided in a moving vehicle, the electronic controlled drive apparatus comprising:

control means having an operational lever;

target value calculating means for calculating a target throttle opening degree and a target shift position based on an inputted position of the operational lever;

a throttle actuator that opens or closes a throttle of the internal combustion engine in accordance with the target throttle opening degree by a control of the control means;

a shift actuator that actuates a shift in accordance with the target shift position by a control of the control means;

determination means for determining whether or not the target shift position is in a shift-in state; and correction throttle opening degree setting means for setting a predetermined throttle opening degree so as to put the throttle into a small opening degree state as a result of the determination means determining that the target shift position is in the shift-in state, wherein when the determination means determined that the target shift position is in the shift-in state, the control means drives the shift actuator to conduct shift connection after driving the throttle actuator to put the throttle into the small opening degree state in which the throttle is opened by the predetermined throttle opening degree.

2. An electronic controlled drive apparatus that conducts drive control of an internal combustion engine which is provided in a moving vehicle, the electronic controlled drive apparatus comprising:

control means having an operational lever;

target value calculating means for calculating a target throttle opening degree and a target shift position based, on an inputted position of the operational lever;

a throttle actuator that opens or closes a throttle of the internal combustion engine in accordance with the target throttle opening degree by a control of the control means;

a shift actuator that actuates a shift in accordance with the target shift position by a control of the control means;

determination means for determining whether or not the target shift position is in a shift-in state; and correction throttle opening degree setting means for setting a predetermined throttle opening degree so as to put the throttle into a small opening degree state when the target shift position is in the shift-in state, wherein when the determination means determined that the target shift position is in the shift-in state, the control means drives the shift actuator to conduct shift connection after driving the throttle actuator to put the throttle into the small opening degree state in which the throttle is opened by predetermined throttle opening degree, wherein the control means and at least one of said throttle actuator and said shift actuator are integrated.

* * * * *